United States Patent
Kim et al.

(10) Patent No.: US 8,812,037 B2
(45) Date of Patent: Aug. 19, 2014

(54) METHOD AND APPARATUS FOR CANCELING INTRODUCED SIGNAL AND COGNITIVE RADIO COMMUNICATION APPARATUS USING THE SAME

(75) Inventors: Sang Won Kim, Daejeon-si (KR); Sun Min Lim, Daejeon-si (KR); Hoi Yoon Jung, Daejeon-si (KR); Byung Jang Jeong, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 370 days.

(21) Appl. No.: 13/304,485

(22) Filed: Nov. 25, 2011

(65) Prior Publication Data

US 2012/0135675 A1 May 31, 2012

(30) Foreign Application Priority Data

Nov. 26, 2010 (KR) .................. 10-2010-0118559

(51) Int. Cl.
*H04B 15/00* (2006.01)
*H04L 27/00* (2006.01)
(52) U.S. Cl.
CPC .................................. *H04L 27/0006* (2013.01)
USPC ..... 455/501; 455/63.1; 455/67.13; 455/114.2

(58) Field of Classification Search
CPC ............................ H04B 1/1027; H03F 1/3247
USPC ............... 455/296, 63.1, 126, 67.13, 24, 125, 455/334, 69, 114.2, 501, 67.11, 115.1; 375/215, 285
See application file for complete search history.

(56) References Cited

U.S. PATENT DOCUMENTS 4,373,115 A * 2/1983 Kahn ............................ 455/126
2004/0198295 A1* 10/2004 Nicholls et al. ............... 455/296

\* cited by examiner

*Primary Examiner* — John J Lee
(74) *Attorney, Agent, or Firm* — H.C. Park & Associates, PLC (57) ABSTRACT

The present invention relates to a wireless communication system and, more particularly, to a spectrum sensing method in cognitive radio communication. According to an aspect of the present invention, a method of canceling an introduced transmission signal includes generating a first signal, having an inverse phase, using a data transmission signal transmitted by a data transmission unit, adjusting a path and/or an amplitude of the first signal, and generating a first signal, having an inverse phase, using a data transmission signal transmitted by a data transmission unit, adjusting a path and/or an amplitude of the first signal, and canceling a second signal, introduced through a data receiving unit, and the first signal by the data transmission signal.

13 Claims, 7 Drawing Sheets

METHOD AND APPARATUS FOR CANCELING INTRODUCED SIGNAL AND COGNITIVE RADIO COMMUNICATION APPARATUS USING THE SAME

This application claims priority from and the benefit of Korean Patent Application No. 10-2010-0118559, filed on Nov. 26, 2010, which is incorporated by reference in entirety herein.

BACKGROUND OF THE INVENTION

1. Field of the Invention

The present invention relates to a wireless communication system and, more particularly, to a spectrum sensing method in cognitive radio communication.

2. Related Art

One or the recent issues of wireless communication technology is how each user uses which radio frequency because increasing users want to use limited radio frequency resources.

Most of personal near-field wireless devices use a common frequency band. However, the common frequency band that can be used by the personal near-field wireless devices is chiefly an unlicensed frequency band and is limited. Other frequency bands require a license, and they are chiefly allocated to specific use.

In this wireless communication environment, it is difficult to provide sufficient communication quality to increasing wireless communication users. Furthermore, in a situation where new heterogeneous devices and new communication services are emerging, how the limited radio resources are allocated to whom is an important problem.

As a scheme for solving the problem, a method of increasing the use efficiency of frequency resources or of efficiently allocating frequency resources needs to be taken into consideration.

SUMMARY OF THE INVENTION

An object of the present invention is to provide a method of integrating a data transmission/reception antenna and a sensing antenna into one antenna in a cognitive radio communication system.

Another object of the present invention is to provide a method of increasing isolation between a data transmission/reception apparatus and a spectrum sensing apparatus, if a data transmission/reception antenna and a sensing antenna are integrated into one antenna in a cognitive radio communication system.

Yet another object of the present invention is to provide a method of improving the system performance and reducing the number of antennas for a system through increased isolation between a data transmission/reception apparatus and a spectrum sensing apparatus, if a data transmission/reception antenna and a sensing antenna are integrated into one antenna in a cognitive radio communication system.

Still yet another object of the present invention is to provide a method of improving spectrum sensing performance, if a data transmission/reception apparatus and a spectrum sensing apparatus use respective antennas in a cognitive radio communication system.

Further yet another object of the present invention is to provide a method of increasing isolation between a data transmission/reception apparatus and a spectrum sensing apparatus, if the data transmission/reception apparatus and the spectrum sensing apparatus use respective antennas in a cognitive radio communication system.

Further yet another object of the present invention is to provide a method of improving an antenna standoff distance through increased isolation between a data transmission/reception apparatus and a spectrum sensing apparatus, if the data transmission/reception apparatus and the spectrum sensing apparatus use respective antennas in a cognitive radio communication system.

According to an aspect of the present invention, there is provided a method of canceling an unwanted introduced transmission signal, including generating a first signal, having an inverse phase, using a data transmission signal transmitted by a data transmission unit, adjusting a path and/or an amplitude of the first signal, and canceling a second signal, introduced through a data receiving unit, and the first signal by the data transmission signal.

Here, the path difference between the introduction path of the second signal and the transmission path of the first signal may be compensating for by adjusting the path of the first signal.

Furthermore, the first signal may be adjusted to have the same amplitude as the second signal.

According to another aspect of the present invention, there is provided a method of canceling an unwanted introduced transmission signal, including adjusting a first signal to have the same path and/or amplitude as a data transmission signal transmitted by a data transmission unit, generating a second signal by inverting the phase of the first signal, and canceling a third signal, received through a data reception unit, and the second signal by the data transmission signal.

The path difference between the introduction path of the third signal and the transmission path of the second signal may be compensated for by adjusting the path of the first signal.

The second signal may be adjusted to have the same amplitude as the third signal.

According to yet another aspect of the present invention, there is provided an apparatus for canceling an introduced transmission signal, including a signal generation unit for generating an inverse phase transmission signal to cancel the introduced transmission signal using a data transmission signal transmitted by a data transmission unit and a signal cancellation unit for canceling the introduced transmission signal by combining the introduced transmission signal and the inverse phase transmission signal.

Here, the signal generation unit may include a signal extraction unit for extracting a signal from the data transmission unit, a phase adjustment unit for inverting the phase of the signal, and a signal adjustment unit for compensating for the path of the signal and adjusting the amplitude of the signal. The inverse phase signal may be generated by inverting the phase of the signal, extracted by the signal extraction unit, through the phase adjustment unit, and by adjusting the amplitude of a signal of the inverse phase identically to the amplitude of the introduced transmission signal and compensating for the path of the signal of the inverse phase by the path difference between the signal of the inverse phase and the introduced transmission signal, through the signal adjustment unit.

Furthermore, the signal adjustment unit may adjust the amplitude and path of the signal using a lookup table generated by the data transmission unit. The lookup table has pieces of information about the amplitude, phase, and path of the introduced transmission signal mapped to the transmission channel, transmission power, and/or output power of the data transmission signal.

Here, the signal generation unit may further include a fine adjustment unit for finely adjusting the phase, path, and amplitude of the inverse phase signal. The fine adjustment unit adjusts the inverse phase signal so that the inverse phase signal has an inverse phase relationship with and the same amplitude as the introduced transmission signal using a lookup table generated by the data transmission unit. The lookup table has pieces of information about the amplitude, phase, and path of the introduced transmission signal mapped with the transmission channel, transmission power, and/or output power of the data transmission signal.

Furthermore, the signal generation unit may include a signal extraction unit for extracting a signal from the data transmission unit, a signal adjustment unit for compensating for the path of the signal and adjusting the amplitude of the signal, and a phase adjustment unit for inverting a phase of the signal. The inverse phase signal may be generated by adjusting the amplitude of the extracted signal identically to the amplitude of the introduced transmission signal and compensating for the path of the extracted signal by the path difference between the extracted signal and the introduced transmission signal, through the signal adjustment unit, and by inverting the phase of the signal having the adjusted path and amplitude, through the phase adjustment unit.

The signal adjustment unit may adjust the amplitude and path of the signal using a lookup table generated by the data transmission unit. The lookup table has pieces of information about the amplitude, phase, and path of the introduced transmission signal mapped with the transmission channel, transmission power, and/or output power of the data transmission signal.

The signal generation unit may further include a fine adjustment unit for finely adjusting the phase, path, and amplitude of the inverse phase signal. The fine adjustment unit may adjust the inverse phase signal so that the inverse phase signal has an inverse phase relationship with and the same amplitude as the introduced transmission signal using a lookup table generated by the data transmission unit. The lookup table has pieces of information about the amplitude, phase, and path of the introduced transmission signal mapped with the transmission channel, transmission power, and/or output power of the data transmission signal.

According to still yet another aspect of the present invention, there is provided a cognitive radio communication apparatus, including an antenna unit for transmitting and receiving data, a data transmission unit for generating a data transmission signal and transmitting a data transmission signal through the antenna unit, a data reception unit for receiving data through the antenna unit, and an introduced signal processing unit for canceling a data transmission signal introduced into the data reception unit. When the data transmission signal transmitted by the data transmission unit is introduced into the data reception unit, the introduced signal processing unit cancels the introduced data transmission signal by generating an inverse phase signal, having an inverse phase relationship with and the same amplitude as the introduced data transmission signal.

If the antenna unit includes a single antenna, the data transmission signal is distributed over the single antenna and the data reception unit at the input terminal of the antenna unit, and a data transmission signal introduced into the data reception unit is the data transmission signal distributed over the data reception unit.

In this case, the introduced signal processing unit may adjust the amplitude, path, and/or phase of the inverse phase signal using a lookup table generated by the data transmission unit. The lookup table has pieces of information about the amplitude, phase, and path of the introduced transmission signal mapped with the transmission channel, transmission power, and/or output power of the data transmission signal.

If the antenna unit includes a data transmission antenna connected to the data transmission unit and a data reception antenna connected to the data reception unit, a data transmission signal introduced into the data reception unit is a data transmission signal, radiated toward the data transmission antenna and applied to the data reception antenna.

Here, the introduced signal processing unit may adjust the amplitude, path, and/or phase of the inverse phase signal using a lookup table generated by the data transmission unit. The lookup table has pieces of information about the amplitude, phase, and path of the introduced transmission signal mapped with the transmission channel, transmission power, and/or output power of the data transmission signal.

Furthermore, the introduced signal processing unit includes a signal extraction unit for extracting a signal from the data transmission unit, a phase adjustment unit for inverting a phase of the signal, a signal adjustment unit for compensating for the path of the signal and adjusting the amplitude of the signal, and an introduced signal cancellation unit for canceling the introduced data transmission signal. The inverse phase signal may be generated by inverting the phase of the signal, extracted by the signal extraction unit, through the phase adjustment unit and by adjusting the amplitude of the signal of the inverse phase identically to the amplitude of the introduced data transmission signal and compensating for the path of a signal of the inverse phase by the path difference between the signal of the inverse phase and the introduced data transmission signal, through the signal adjustment unit. The introduced signal cancellation unit may cancel the introduced data transmission signal by combining the introduced data transmission signal and the inverse phase signal.

The introduced signal processing unit includes a signal extraction unit for extracting a signal from the data transmission unit, a signal adjustment unit for compensating for the path of the signal and adjusting the amplitude of the signal, a phase adjustment unit for inverting a phase of the signal, and an introduced signal cancellation unit for canceling the introduced data transmission signal. The inverse phase signal may be generated by adjusting the amplitude of the extracted signal identically to the amplitude of the introduced transmission signal and compensating for the path of the extracted signal by the path difference between the extracted signal and the introduced transmission signal, through the signal adjustment unit, and by inverting the phase of the signal having the adjusted path and amplitude, through the phase adjustment unit. The introduced signal cancellation unit may cancel the introduced data transmission signal by combining the introduced data transmission signal and the inverse phase signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

As a method of integrating and accommodating a plurality of wireless communication standards through a single transmission/reception system, there is Software Defined Radio (hereinafter referred to as 'SDR') technology.

Unlike the existing Hardware Defined Radio (HDRO) communication system, most of the function blocks of an SDR communication system, including an RF region after antennas, are performed by a programmable software module. Accordingly, a plurality of wireless communication standards can be integrated and accommodated through a single transmission and reception system by only changing modulated software even without a modification, a change, or replacement in hardware.

Furthermore, the SDR technology is not limited to the reconfiguration of hardware in software, but has a common hardware platform supporting multiple modes, multiple bands, and multiple functions in the RF stage and a modular software structure capable of defining the characteristics of the bands, modes, functions, etc. from a viewpoint of a system or user. Here, the characteristics of the bands, modes, functions, etc. may not be defined from a viewpoint of a system or user, but may be defined itself.

As a concept advanced from the SDR technology in order to improve the use efficiency of the frequency, there is cognitive radio communication technology. The cognitive radio communication technology is a wireless communication technology for determining wireless communication parameters by sensing surrounding environments. In accordance with the cognitive radio communication technology, frequency resources can be allocated and used without generating interference between wireless communication users by cognizing the states of dynamically changing frequency resources. For example, frequency resources that are not being used may be cognized and allocated to a user who wants the frequency resources.

As described above, however, most of frequency resources are used by licensed users for specific purposes. Accordingly, the licensed users (that is, users having higher priority) for a corresponding frequency have to be able to use the corresponding frequency when they want the corresponding frequency.

The cognitive radio communication technology is technology in which during the time for which a user who has a frequency license does not use a relevant frequency band, the user of a cognitive radio communication system who does not have the frequency license can use the relevant frequency band. In the cognitive radio communication technology, the right of use of the user who has the frequency license has to be able to be guaranteed, and communication quality of a predetermined level or higher has to be able to be guaranteed for the users of the cognitive radio communication system.

Hereinafter, a user who has a frequency license for a relevant frequency band is referred to as a primary user, and a user of a cognitive radio communication system who does not have the frequency license for the relevant frequency band is referred to as a secondary user.

In order to guarantee the right of use of the primary user, a spectrum is sensed, and the secondary user can use the relevant frequency band only if there is a frequency band (channel) not used by the primary user based on a result of the sensing. Accordingly, in cognitive radio communication, an empty frequency band and the presence of the primary user have to be able to be detected through continuous sensing.

Figure 1:
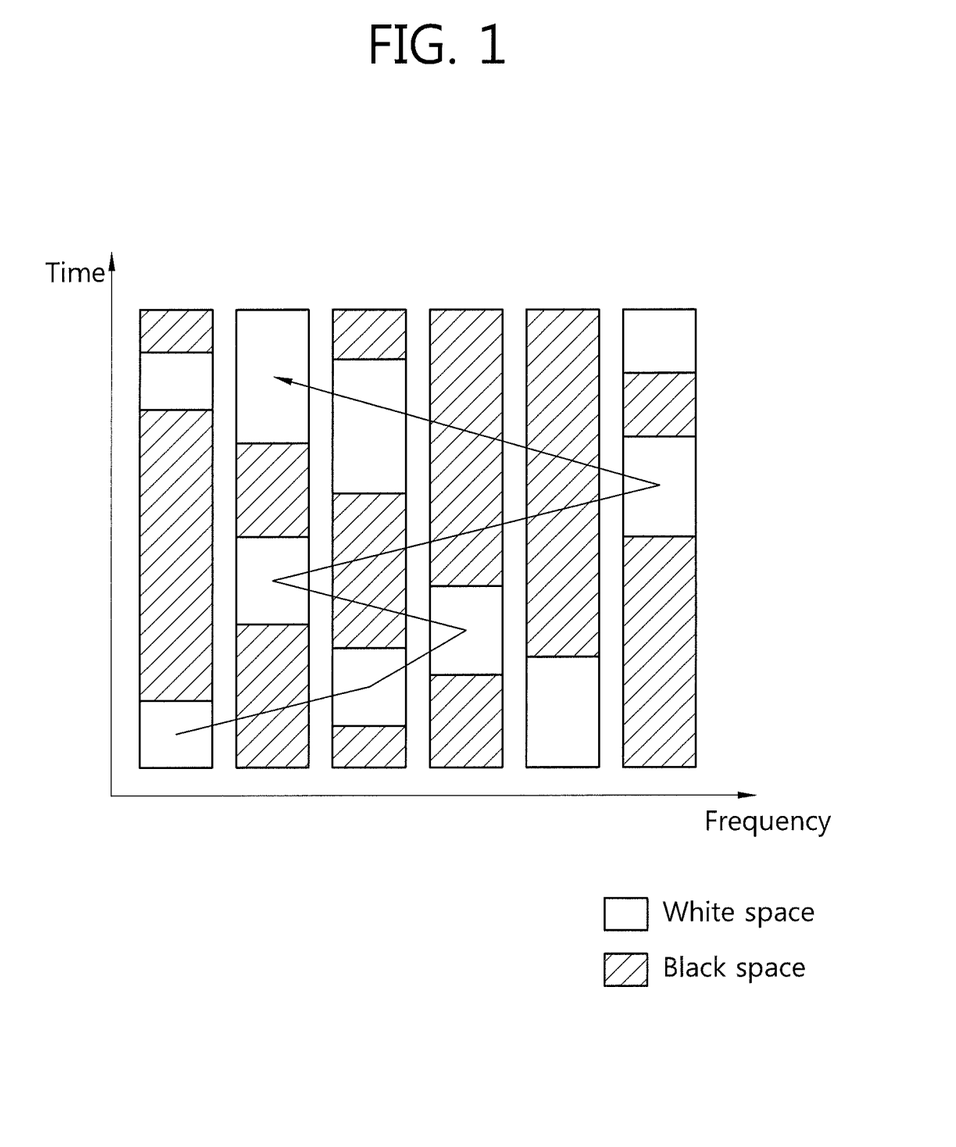
FIG. 1 is a conceptual diagram schematically illustrating the movement of the use frequency band of a secondary user in cognitive radio communication.

FIG. 1 is a conceptual diagram schematically illustrating the movement of the use frequency band of a secondary user in cognitive radio communication. The secondary user uses a specific frequency band and, when the primary user for the specific frequency band emerges, finds and moves to a white space (that is, a frequency band not used by the primary user). As a concept corresponding to the white space, the frequency band being used by the primary user is a black space.

As described above, a cognitive radio communication system cognizes whether a primary user is using a frequency band already allocated thereto and if, as a result of the cognition, the primary user does not use the frequency band, permits a secondary user to use the frequency band.

As described above, in order not to generate interference with a primary user, a cognitive radio communication system has to be able to cognize whether the primary user for a frequency band (that is, channel) being used by a secondary user appears. If the primary user appears, the secondary user has to empty the relevant frequency band (that is, channel). In the cognitive radio communication system, to detect whether the primary user for a channel being used by the secondary user appears is called inband sensing.

Meanwhile, in preparation for the case where a channel being used has to be emptied when a primary user for a channel appears, a cognitive radio communication system has to be able to continuously perform spectrum sensing for candidate channels so that the channel being used can be changed when the primary user for the channel being used appears. In a cognitive radio communication system, in preparation for the case where a primary user appears, to sense candidate channels that can be used by a secondary user after the secondary user moves is called outband sensing.

Inband sensing is performed to determine whether a primary user for a channel being used by a secondary user appears in a cognitive radio communication system. The channel (that is, the subject of spectrum sensing) is a channel now being used by the secondary user.

In inband sensing, if spectrum sensing is performed while data is transmitted and received, an interference signal according to the transmission and reception of data has an effect on the spectrum sensing. For this reason, it is difficult to perform data transmission/reception and spectrum sensing at the same time in the same time zone within an inband. In order to solve the problem, a Quiet Period (QP) in which inband sensing is performed during a data transmission and reception process is used. During the QP, the transmission and reception of data is paused, and inband sensing is performed.

Outband sensing is performed to prepare for candidate channels so that a secondary user can change the existing channel to the candidate channels, if the appearance of a primary user is cognized while the secondary user uses the existing channels. The subject of spectrum sensing is a channel not being used by the secondary user. In outband sensing, a channel not being used by a secondary user (that is, a cognitive radio communication system) for data transmission and reception is the subject. Accordingly, if an additional receiver and an additional antenna for spectrum sensing are installed in the cognitive radio communication system, the transmission and reception of data needs not to be paused for outband sensing.

If the sensing antenna and the sensing receiver for spectrum sensing are installed in the cognitive radio communication system as described above, the transmission and reception of data can be performed and, at the same time, outband sensing can be performed by using the sensing antenna and the sensing receiver. In this case, since the transmission and reception of data needs not to be paused for outband sensing, outband sensing can be performed without affecting the Quality of Service (QoS) of the system.

In a system having the above structure, the sensing receiver always monitors surrounding conditions for inband sensing and outband sensing, and a data transmitter-receiver transmits and receives data signals based on a predetermined schedule. However, in periods other than the QP or the data reception period, the transmission signals of the data transmitter-receiver have an effect on the sensing receiver. It is also very difficult to fabricate a switch for independently maintaining the three paths of sensing reception, data transmission, and data reception. For this reason, isolation between the sensing receiver and the data transmitter-receiver is chiefly maintained using two antennas.

In a widely used wideband direct conversion structure, however, if a standoff distance between the antennas of a data transmission/reception unit and a sensing antenna is not sufficient, it is difficult to obtain a reliable spectrum sensing result owing to the saturation of the sensing receiver and an increase in the noise level. Accordingly, if the data transmitter-receiver and the spectrum sensing apparatus use respective antennas, the accuracy of spectrum sensing is decreased and error is increased, because of an increase in the necessary number of antennas and of increased interference between the data transmitter-receiver and the sensing receiver.

Figure 2:
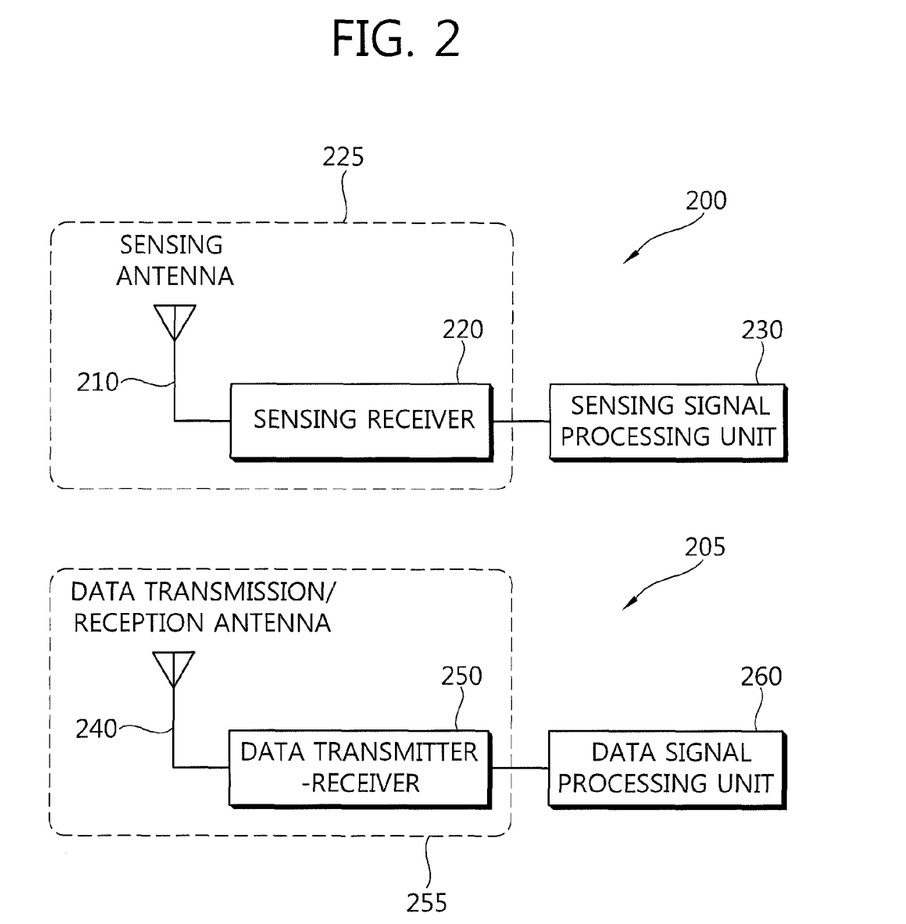
FIG. 2 is a block diagram schematically showing a cognitive radio communication system including a data processing apparatus and a spectrum sensing apparatus.

FIG. 2 is a block diagram schematically showing a cognitive radio communication system including a data processing apparatus and a spectrum sensing apparatus.

The spectrum sensing apparatus 200 includes a sensing reception unit 225, including a sensing antenna 210 and a sensing receiver 220, and a sensing signal processing unit 230. The data processing apparatus 205 includes a data transmission/reception unit 255, including a data transmission/reception antenna 240 and a data transmitter-receiver 250, and a data signal processing unit 260.

The sensing reception unit 225 is connected to the sensing antenna 210 and configured to receive data for spectrum sensing. The sensing reception unit 225 transmits the received data to the sensing signal processing unit 230 for performing a spectrum sensing operation.

The data transmission/reception unit 255 is connected to the data signal processing unit 260 for processing transmission and reception data and configured to transmit and receive data.

If the standoff distance between the sensing antenna 210 and the data transmission/reception antenna 240 is not sufficient, a transmission data signal transmitted through the data transmission/reception antenna 240 has an effect on the sensing receiver 220, and thus error in spectrum sensing may be increased.

In order to prevent the problem, if isolation between the sensing reception unit 225 of the spectrum sensing apparatus 200 and the data transmission/reception unit 255 of the data processing apparatus 205 is increased, although the standoff distance between the data transmission/reception antenna 240 and the sensing antenna 210 is small, an increase in the error of spectrum sensing can be prevented, and furthermore error of spectrum sensing can be reduced.

Furthermore, the sensing antenna 210 and the data transmission/reception antenna 240 may be integrated into one antenna and used by increasing isolation between the sensing reception unit 225 of the spectrum sensing apparatus 200 and the data transmission/reception unit 255 of the data processing apparatus 205. In this case, not only the accuracy of spectrum sensing can be improved, but also the use efficiency of antennas can be increased. Accordingly, the size and area of a system can be reduced when the system is implemented.

For example, if data transmission and spectrum sensing are performed at the same time, particularly, if a data transmission channel and a spectrum sensing channel are adjacent to each other, a transmission data signal may generate interference with the data of the sensing receiver. In this case, if isolation between the data transmission/reception unit of the data processing apparatus and the sensing receiver of the spectrum sensing apparatus is increased, a reliable spectrum sensing result can be obtained in a data transmission period. Furthermore, if the sensing antenna and the data transmission/reception antenna are integrated into one antenna and used, the antenna standoff distance and the number of antennas are reduced in terms of the implementation of a system. Accordingly, a cognitive radio communication system of a compact size, including the sensing receiver, can be implemented.

Figure 3:
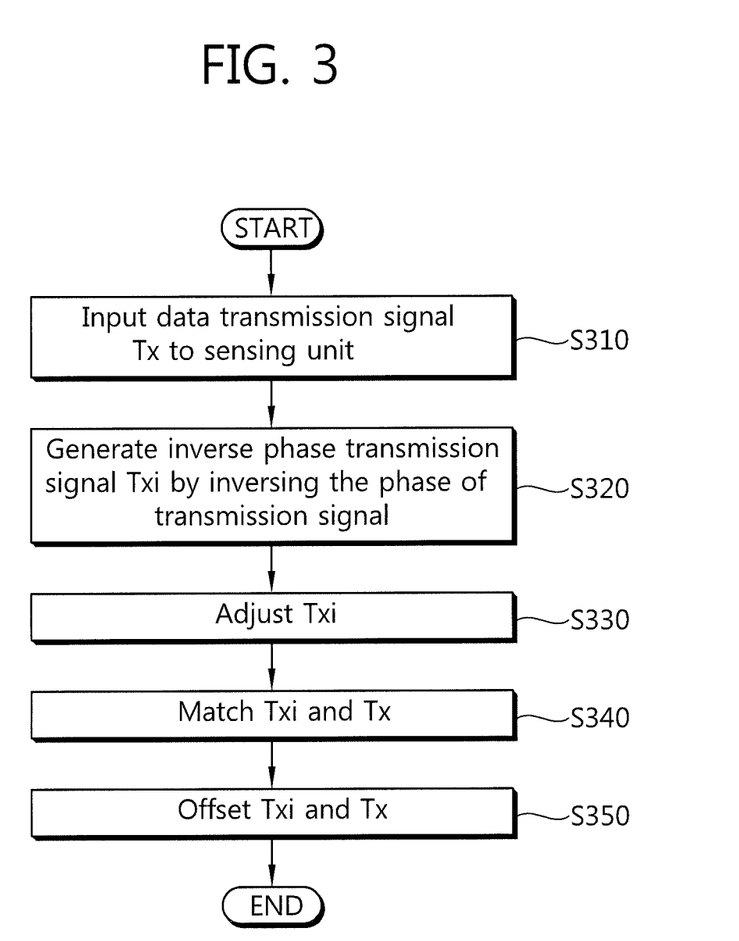
FIG. 3 is a flowchart schematically illustrating a method of increasing isolation between the data transmission and reception units of the data processing apparatus and the sensing receiver of the spectrum sensing apparatus in the cognitive radio communication system to which the present invention is applied.

FIG. 3 is a flowchart schematically illustrating a method of increasing isolation between the data transmission/reception unit of the data processing apparatus and the sensing receiver of the spectrum sensing apparatus in the cognitive radio communication system to which the present invention is applied.

When the data transmission unit of the data transmission/reception apparatus transmits a data transmission signal, the spectrum sensing apparatus also receives a data transmission signal $T_x$ at step S310. The transmission signal $T_x$ received by the spectrum sensing apparatus may have a different amplitude and phase from the transmission signal transmitted by the data transmission/reception apparatus.

The data transmission unit generates an inverse phase transmission signal $T_{xi}$ by inversing the phase of the transmission signal at step S320. The inverse phase transmission signal $T_{xi}$ has a phase difference of 180° from the transmission signal $T_x$.

In the above example, the data transmission unit is illustrated to first transmit the transmission signal $T_x$ and then generate the inverse phase transmission signal. However, the present invention is not limited to the above example. For example, the data transmission unit may transmit the transmission signal $T_x$ and, at the same time, generate the inverse phase transmission signal $T_{xi}$. In some embodiments, the data transmission unit may generate the inverse phase transmission signal $T_{xi}$ before and after transmitting the transmission signal $T_x$.

The generated inverse phase transmission signal $T_{xi}$ is adjusted at step S330. More particularly, the transmission path of the inverse phase transmission signal $T_{xi}$ is compensated for according to the transmission path of the transmission signal $T_x$ received by the spectrum sensing apparatus. Furthermore, the amplitude of the inverse phase transmission signal $T_{xi}$ is amplified according to the amplitude of the transmission signal $T_x$ received by the spectrum sensing apparatus.

The adjusted inverse phase transmission signal $T_{xi}$ is matched with the transmission signal $T_x$ received by the spectrum sensing apparatus at step S340. The inverse phase transmission signal $T_{xi}$ is additionally finely adjusted. Accordingly, the inverse phase transmission signal $T_{xi}$ has a phase difference of 180° from the transmission signal $T_x$ received by the spectrum sensing apparatus, but has the same amplitude and path difference as the transmission signal $T_x$ received by the spectrum sensing apparatus. If the inverse phase transmission signal $T_{xi}$ has been accurately adjusted at step S330, the step S340 of matching the transmission signal $T_x$ with the inverse phase transmission signal $T_{xi}$ may be omitted.

The fine adjustment for the inverse phase transmission signal $T_{xi}$ may be performed using a lookup table. The lookup table includes adjustment values for accurately matching the inverse phase transmission signal $T_{xi}$ with the transmission signal $T_x$ in an opposite phase on the basis of a transmitter channel and transmission power regarding the transmission signal $T_x$.

The fine adjustment for the inverse phase transmission signal $T_{xi}$ may be performed by the sensing reception unit of the spectrum sensing apparatus or may be performed by the data transmission unit of the data transmission/reception apparatus. The cognitive radio communication system may further include a construction for performing adjustment or fine adjustment for the inverse phase transmission signal $T_{xi}$.

The transmission signal $T_x$ and the inverse phase transmission signal $T_{xi}$ received by the spectrum sensing apparatus are combined and canceled at step S350. The cancellation according to the combination of the transmission signal $T_x$ and the inverse phase transmission signal $T_{xi}$ is performed before the transmission signal $T_x$ and the inverse phase transmission signal $T_{xi}$ reach the sensing reception unit of the spectrum sensing apparatus or before interference is generated in the sensing reception unit.

Hereinafter, methods of isolation between a data transmission/reception unit and a sensing reception unit according to the construction of antennas used by a data transmission/reception apparatus and a spectrum sensing apparatus are described in connection with detailed embodiments of the present invention.

Embodiment 1

If an Integration Antenna is Used

Figure 4:
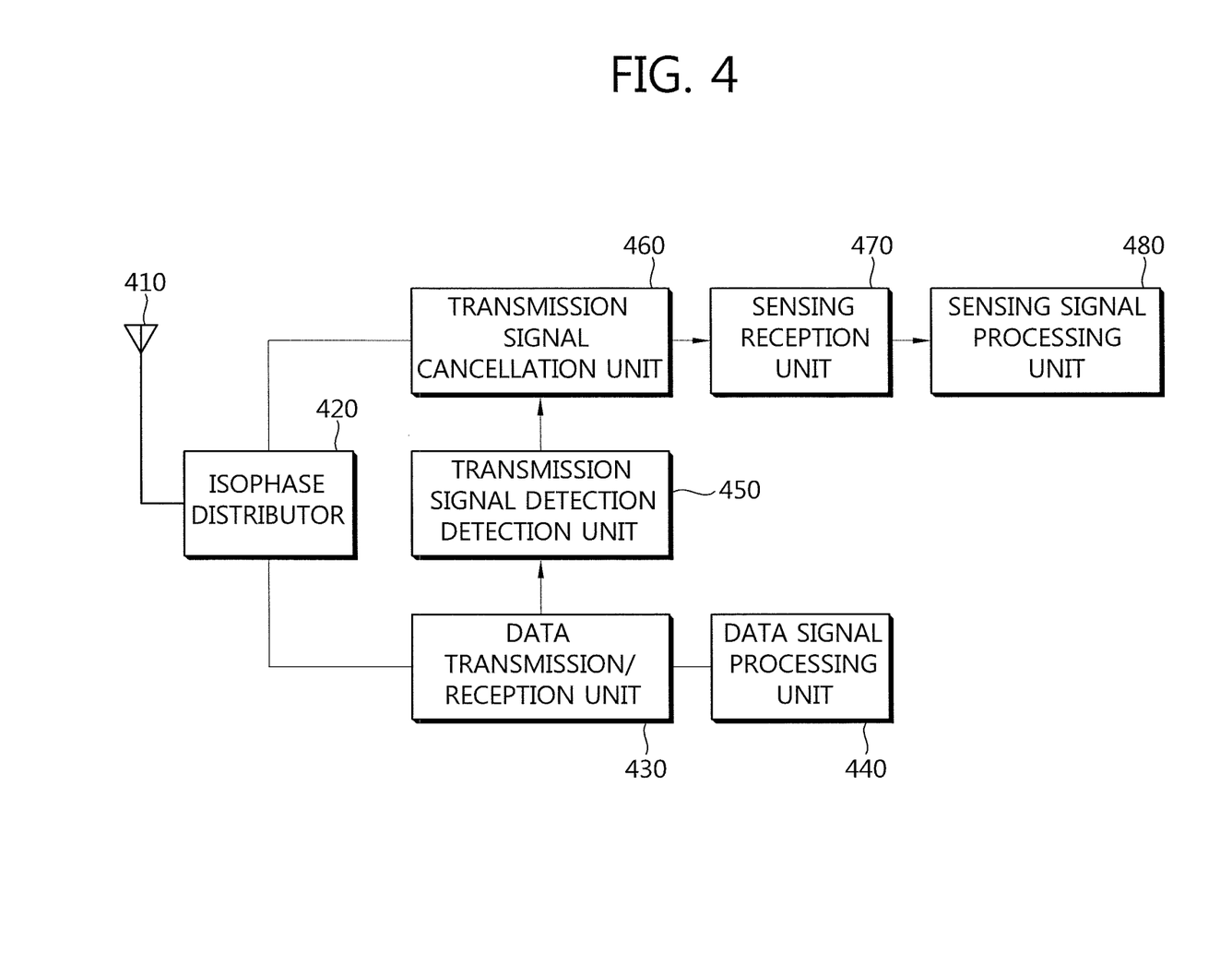
FIG. 4 is a block diagram schematically showing an embodiment of the present invention if one integration antenna is shared by a data transmission/reception apparatus and a spectrum sensing apparatus.

FIG. 4 is a block diagram schematically showing an embodiment of the present invention if one integration antenna is shared by a data transmission/reception apparatus and a spectrum sensing apparatus.

A transmission signal $T_x$ processed by a data signal processing unit 440 is transmitted by a data transmission/reception unit 430. The transmission signal $T_x$ is distributed over an integration antenna 410 and a sensing reception apparatus (470 and 480) through an isophase distributor 420.

The data transmission/reception unit 430 generates an inverse phase transmission signal $T_{xi}$, having an inverse phase relationship with the transmission signal $T_x$, through a transmission signal detection unit 450. The transmission signal cancellation unit 460 cancels the transmission signal $T_x$, distributed over the sensing reception apparatus (470 and 480), and the inverse phase transmission signal $T_{xi}$ generated by the transmission signal detection unit 450.

Accordingly, the sensing reception unit 470 and the sensing signal processing unit 480 can perform spectrum sensing without being influenced by the interference of the transmission signal $T_x$ transmitted by the data transmission/reception apparatus.

In the present embodiment, a transmission signal generating interference is removed by the transmission signal cancellation circuits 450 and 460 without using a switch at the end of an antenna. Accordingly, although the data transmission/reception apparatus generates a strong transmission signal in channels adjacent to a spectrum sensing channel, the saturation of an input signal of the spectrum sensing apparatus can be prevented.

Since isolation between the data transmission/reception apparatus and the spectrum sensing apparatus is increased, the performance of the spectrum sensing apparatus can be improved. According to the present invention, spectrum sensing and the transmission operation of the data transmitter-receiver can be performed at the same time. Furthermore, system performance can be improved according to an increase in the time of spectrum sensing.

Figure 5:
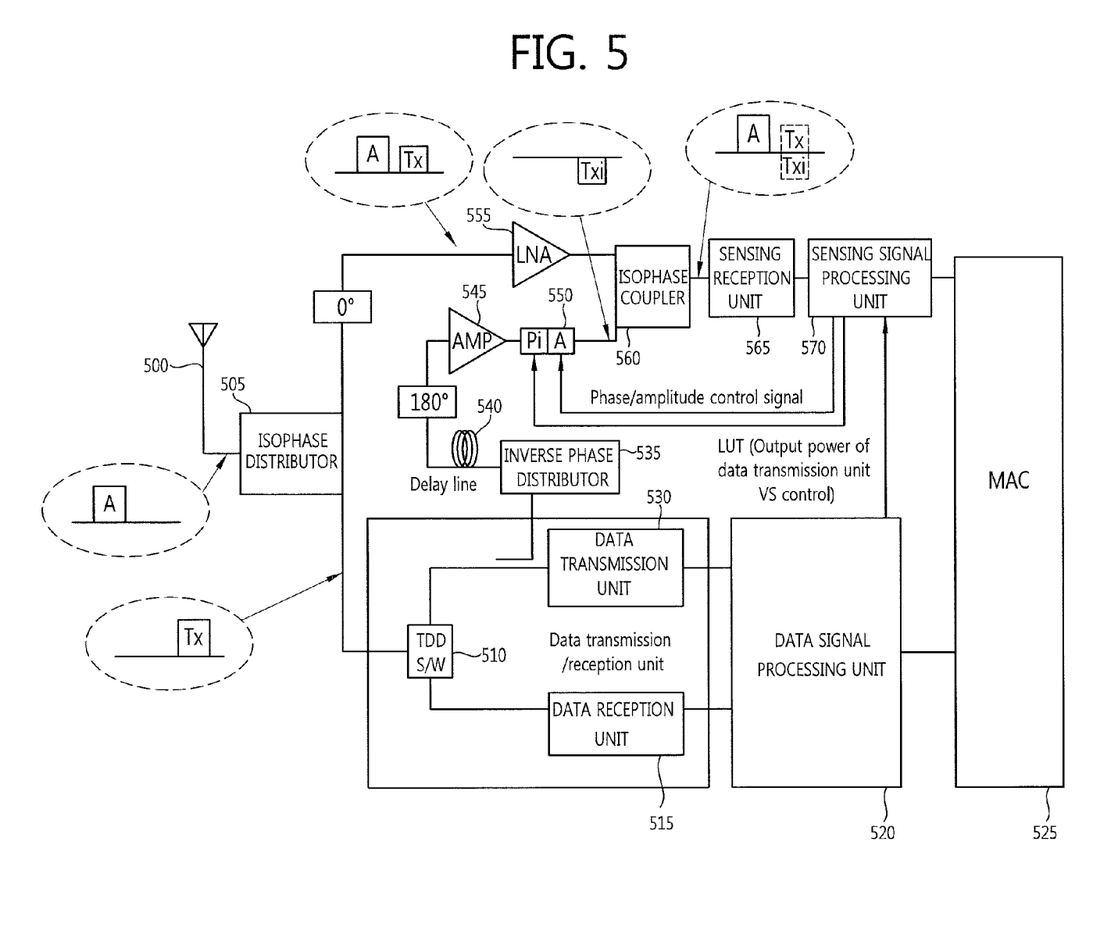
FIG. 5 is a circuit diagram schematically showing an example of the data transmission/reception apparatus and the spectrum sensing apparatus of a cognitive radio communication system according to an embodiment of the present invention.

FIG. 5 is a circuit diagram schematically showing an example of the data transmission/reception apparatus and the spectrum sensing apparatus of a cognitive radio communication system according to an embodiment of the present invention.

An isophase distributor 505 distributes a transmission signal $T_x$, transmitted by data transmission and reception units, into an integration antenna 500 and a Low Noise Amplifier (LNA) 555 in isophase.

Furthermore, the data transmission unit 530 distributes the transmission signal through an inverse phase distributor 535. The phase of the distributed transmission signal is converted into an inverse phase, and thus the converted signal has a phase difference of 180° from the transmission signal $T_x$ distributed over the isophase distributor 505. The transmission signal, distributed over the inverse phase distributor 535 and then transmitted, is referred to as an inverse phase transmission signal $T_{xi}$, for convenience of description.

A delay line 540 compensates for a path difference between the transmission signal $T_x$, received via the isophase distributor 505 and the LNA 555, and the inverse phase transmission signal $T_{xi}$. An AMP 545 amplifies the amplitude of the inverse phase transmission signal $T_{xi}$ so that the inverse phase transmission signal $T_{xi}$ has an adequate amplitude corresponding to the amplitude of the transmission signal $T_x$ received via the isophase distributor 505 and the LNA 555.

A phase/amplitude control unit 550 controls the phase and amplitude of the inverse phase transmission signal $T_{xi}$ so that the inverse phase transmission signal $T_{xi}$ has an inverse phase to and the same amplitude as the transmission signal $T_x$ received via the isophase distributor 505 and the LNA 555. The control operation of the phase/amplitude control unit 550 may be controlled in response to a phase/amplitude control signal generated by a sensing signal processing unit 570. The sensing signal processing unit 570 may acquire a Look Up Table (LUT), necessary to control the phase and amplitude of the inverse phase transmission signal $T_{xi}$, from a data signal processing unit 520.

The signals $T_x$ and $T_{xi}$ on the two paths are combined by an isophase coupler 560. The two signals $T_x$ and $T_{xi}$ are canceled by the combination because they have opposite phases. Meanwhile, a sensing signal A that will be received by the spectrum sensing apparatus is received through the integration antenna 500. The sensing signal A passing through the isophase distributor 505 is amplified by the LNA 555. The sensing signal A is applied to the isophase coupler 560. As described above, when the data transmission and reception units transmit the data transmission signal, the sensing signal A, together with the transmission signal $T_x$ distributed over the LNA 555, is applied to the isophase coupler 560 via the isophase coupler 560. However, as described above, a sensing reception unit 565 can receive only the sensing signal A because the transmission signal $T_x$ applied to the isophase coupler 560 is cancel against the inverse phase signal $T_{xi}$.

Since the transmission signal cancellation circuit (535, 540, 545, 550, and 560) is used as described above, isolation between the data transmission/reception apparatus and the spectrum sensing apparatus can be secured even in the transmission period of the data transmission/reception apparatus, and inband and outband sensing and data transmission and reception can be performed using one antenna.

Embodiment 2

If Individual Antennas are Used

Figure 6:
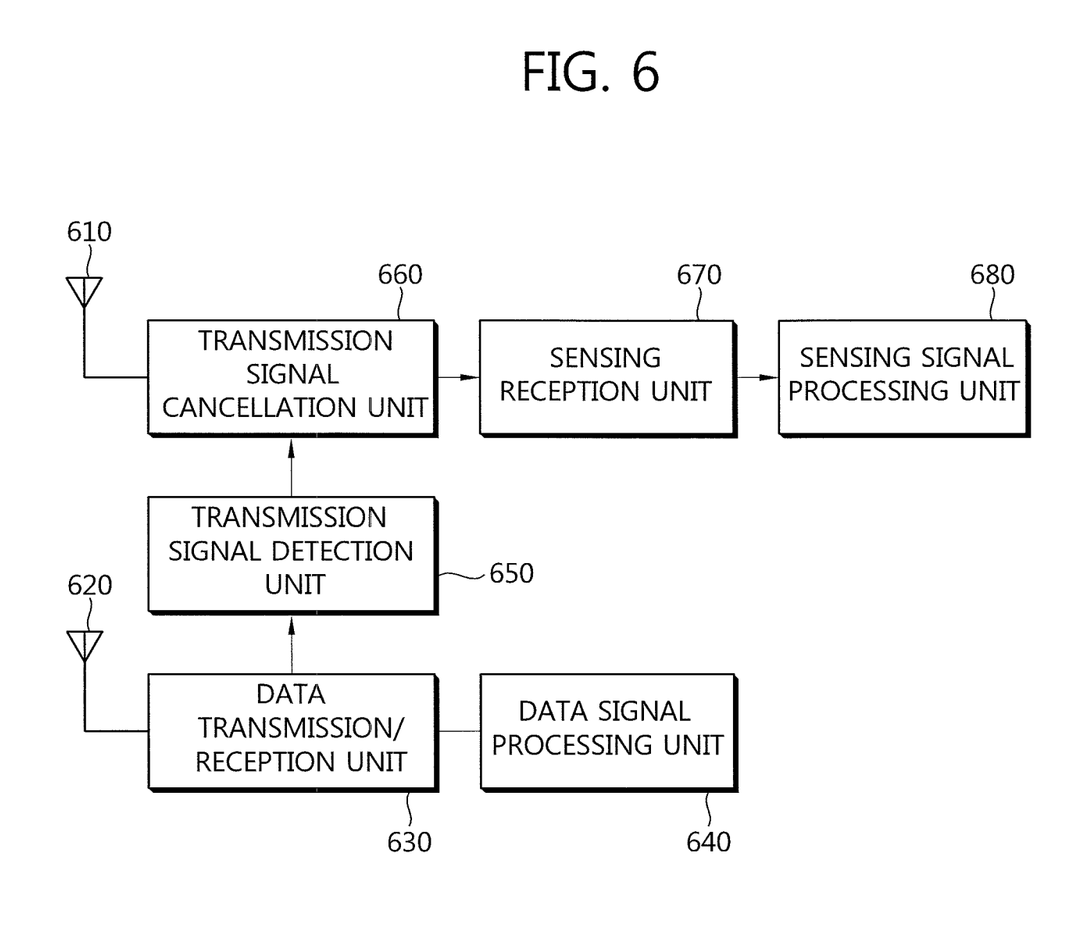
FIG. 6 is a block diagram schematically showing an embodiment of the present invention if a data transmission/reception apparatus and a spectrum sensing apparatus use respective antennas.

FIG. 6 is a block diagram schematically showing an embodiment of the present invention if the data transmission/reception apparatus and the spectrum sensing apparatus use respective antennas.

A transmission signal $T_x$ processed by a data signal processing unit 640 is transmitted by a data transmission/reception unit 630. The transmission signal $T_x$ is transmitted through a data transmission/reception antenna 620 and also received by a sensing antenna 610. Next, the transmission signal $T_x$ is transmitted to a sensing reception apparatus (670, 680).

The data transmission/reception unit 630 generates an inverse phase transmission signal $T_{xi}$, having an inverse phase relationship with the transmission signal $T_x$, through a transmission signal detection unit 650. A transmission signal cancellation unit 660 cancels the transmission signal $T_x$, transmitted to the sensing reception apparatus (670, 680), and the inverse phase transmission signal $T_{xi}$ generated by the transmission signal detection unit 650.

Accordingly, the sensing reception unit 670 and the sensing signal processing unit 680 can perform spectrum sensing without being influenced by the interference of transmission signal $T_x$ transmitted by the data transmission/reception apparatus.

If the two antennas are separately used, in order to prevent the transmission signal of the data transmission/reception apparatus from being introduced into the spectrum sensing apparatus, isolation of a predetermined distance or more is required between the two antennas. The wavelength of a communication system using low VHF/UHF bands is twice or more longer than that of a communication system using a frequency band of 2 GHz or more. For this reason, in communication systems using low VHF/UHF bands, the standoff distance between antennas becomes an obstacle to a reduction in the size of portable devices or small-sized systems. Although the two antennas for data transmission and reception and for spectrum sensing are used in the present invention, the standoff distance between the two antennas can be reduced because isolation between the data transmission/reception apparatus and the spectrum sensing apparatus is increased by the transmission signal cancellation unit 660.

Figure 7:
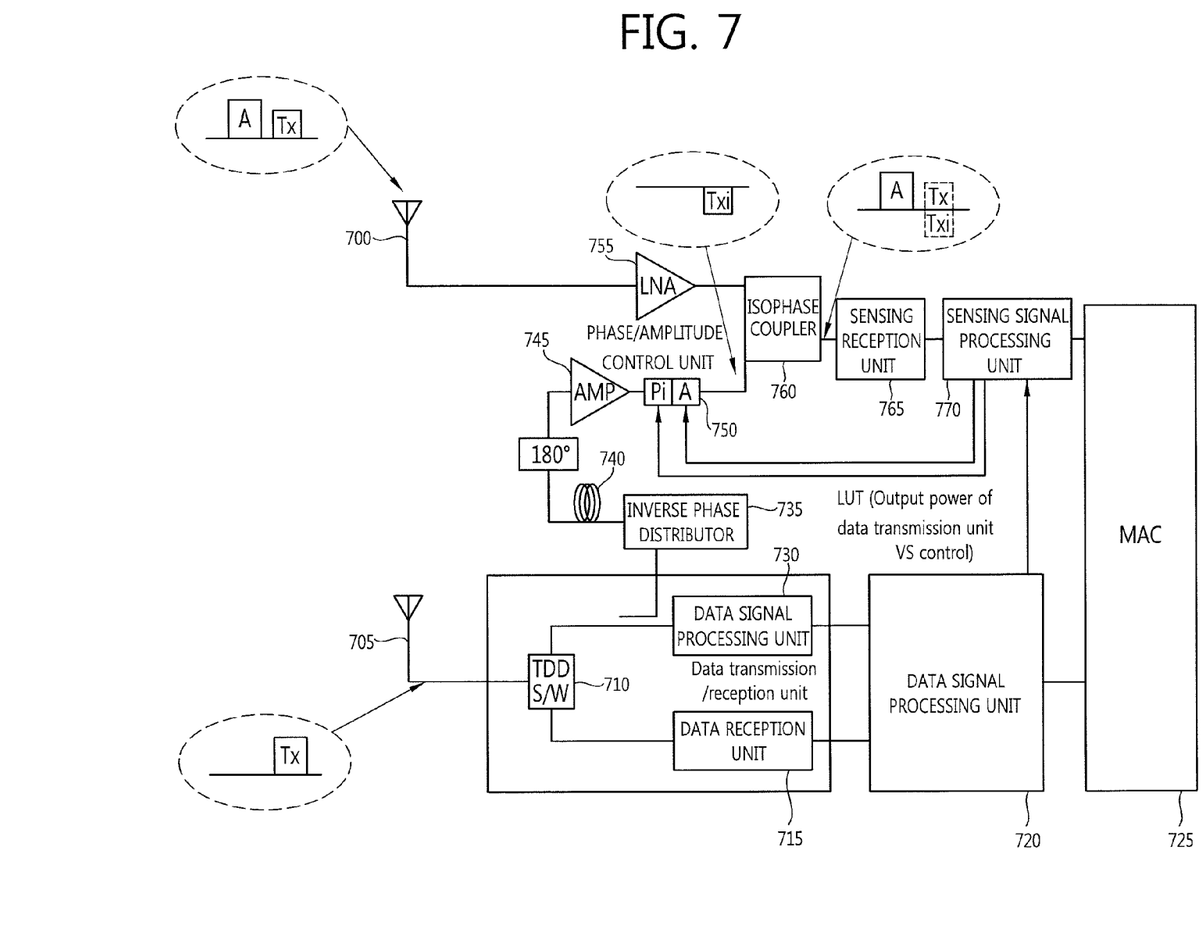
FIG. 7 is a circuit diagram schematically showing a detailed example of the data transmission/reception apparatus and the spectrum sensing apparatus of the cognitive radio communication system according to another embodiment of the present invention.

FIG. 7 is a circuit diagram schematically showing an example of the data transmission/reception apparatus and the spectrum sensing apparatus of the cognitive radio communication system shown in FIG. 6 according to an embodiment of the present invention.

A transmission signal $T_x$ radiated by a data transmission/reception antenna 705 is transferred to the spectrum sensing apparatus via a sensing antenna 700. The spectrum sensing apparatus continues to operate for inband and outband sensing. Thus, if the transmission signal $T_x$ applied to the spectrum sensing apparatus remains intact, it becomes difficult to sense a sensing signal A if the sensing signal A is contiguous to a transmission signal channel or the sensing signal A has a low amplitude.

A data transmission unit 730 radiates the transmission signal $T_x$ to the data transmission antenna 705 and, at the same time, distributes the transmission signal into an inverse phase distributor 735. The phase of the distributed transmission signal is converted into an inverse phase, and thus the converted transmission signal has a phase difference of 180° from the transmission signal $T_x$ applied to the sensing antenna 700. The transmission signal, distributed over the inverse phase distributor 735 and transmitted, is referred to as an inverse phase transmission signal $T_{xi}$, for convenience of description.

A delay line 740 compensates for a path difference between the transmission signal $T_x$, received via the sensing antenna 700 and an LNA 755, and the inverse phase transmission signal $T_{xi}$. An AMP 745 amplifies the amplitude of the inverse phase transmission signal $T_{xi}$ so that the inverse phase transmission signal $T_{xi}$ has an adequate amplitude corresponding to the amplitude of the transmission signal $T_x$ received via the sensing antenna 700 and the LNA 755.

A phase/amplitude control unit 750 controls the phase and amplitude of the inverse phase transmission signal $T_{xi}$ so that the inverse phase transmission signal $T_{xi}$ has an inverse phase to and the same amplitude as the transmission signal $T_x$ received via the sensing antenna 700 and the LNA 755. The control operation of the phase/amplitude control unit 750 may be controlled in response to a phase/amplitude control signal generated by a sensing signal processing unit 770. The sensing signal processing unit 770 may acquire a Look Up Table (LUT), necessary to control the phase and amplitude of the inverse phase transmission signal $T_{xi}$, from a data signal processing unit 720.

The signal $T_x$ and $T_{xi}$ on the two paths are combined by an isophase coupler 760. The two signals $T_x$ and $T_{xi}$ are canceled by the combination because they have opposite phases. Meanwhile, a sensing signal A that will be received by the spectrum sensing apparatus is received through the sensing antenna 700. The sensing signal A is amplified by the LNA 755. The amplified sensing signal A is applied to the isophase coupler 760. As described above, although the sensing signal A, together with the transmission signal $T_x$ received through the sensing antenna 700, is applied to the isophase coupler 760, a sensing reception unit 765 can receive only the sensing signal A because the transmission signal $T_x$ applied to the isophase coupler 760 is cancel against the inverse phase signal $T_{xi}$.

If the transmission signal cancellation circuit (735, 740, 745, 750, and 760) is used as described above, not only isolation between the data transmission/reception apparatus and the spectrum sensing apparatus can be improved, but also the standoff distance between the sensing antenna 700 and the data transmission/reception antenna 705 can be greatly reduced.

In order to cancel a data transmission signal introduced into the spectrum sensing apparatus, an inverse phase signal for the data transmission signal is illustrated to be first generated, and the path and amplitude of the inverse phase signal are illustrated to be then adjusted, for convenience of description. However, the present invention is not limited to the above example. For example, the path and amplitude of a signal may be first adjusted, and the phase of the signal may be then inverted to produce an inverse phase signal.

According to the present invention, a data transmission/reception antenna and a sensing antenna are integrated into one antenna in a cognitive radio communication system. Accordingly, the utilization of the antenna can be increased.

According to the present invention, even if a data transmission/reception antenna and a sensing antenna are integrated into one antenna in a cognitive radio communication system, isolation between a data transmission/reception apparatus and a spectrum sensing apparatus can be increased.

According to the present invention, even if a data transmission/reception antenna and a sensing antenna are integrated into one antenna in a cognitive radio communication system, system performance can be increased and the number of antennas for a system can be reduced through increased isolation between a data transmission/reception apparatus and a spectrum sensing apparatus.

According to the present invention, even if a data transmission/reception apparatus and a spectrum sensing apparatus use respective antennas in a cognitive radio communication system, spectrum sensing performance can be improved.

According to the present invention, even if a data transmission/reception apparatus and a spectrum sensing apparatus use respective antennas in a cognitive radio communication system, isolation between the data transmission/reception apparatus and the spectrum sensing apparatus can be increased.

According to the present invention, even if a data transmission/reception apparatus and a spectrum sensing apparatus use respective antennas in a cognitive radio communication system, an antenna standoff distance can be improved through increased isolation between the data transmission/reception apparatus and the spectrum sensing apparatus.

In the above-described exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of illustrations. Although all kinds of possible combinations for representing the various aspects may not be described, a person having ordinary skill in the art will understand that other possible combinations are possible. Accordingly, the present invention is intended to cover all other replacements, modifications, and changes belonging to the scope of the claims.

What is claimed is:

1. An apparatus for canceling a transmission signal, the apparatus comprising:
a signal generation unit to provide a first signal using a data transmission signal transmitted by a data transmission unit, the first signal having a phase corresponding to an inverse of a phase of the data transmission signal; and
a signal cancellation unit to cancel a second signal by combining the second signal and the first signal,
wherein the signal generation unit comprises:
a phase adjustment unit to invert a phase of the first signal; and
a signal adjustment unit to compensate for a path of the first signal and to adjust an amplitude of the first signal, and
wherein the signal adjustment unit is configured to adjust the amplitude of the first signal to have the same amplitude as the second signal and to compensate for the path of the first signal with a path difference between the first signal and the second signal.

2. The apparatus as claimed in claim 1, wherein:
the signal adjustment unit is configured to adjust the amplitude and compensate for the path of the first signal using a lookup table generated by the data transmission unit; and
the lookup table comprises pieces of information about an amplitude, phase, and path of the second signal mapped with a transmission channel, transmission power, and/or output power of the data transmission signal.

3. The apparatus as claimed in claim 1, wherein:
the signal generation unit further comprises a fine adjustment unit to adjust for the phase, path, and amplitude of the first signal;
the adjusted first signal comprises an inverse phase relationship with the second signal and an identical amplitude to the second signal using a lookup table generated by the data transmission unit; and
the lookup table comprises pieces of information about an amplitude, phase, and path of the second signal mapped with a transmission channel, transmission power, and/or output power of the data transmission signal.

4. An apparatus for canceling a transmission signal, the apparatus comprising:
a signal generation unit to provide a first signal using a data transmission signal transmitted by a data transmission unit, the first signal having a phase corresponding to an inverse of a phase of the data transmission signal; and
a signal cancellation unit to cancel a second signal by combining the second signal and the first signal,
wherein the signal generation unit comprises:
a signal adjustment unit to compensate for a path of the first signal and to adjust an amplitude of the first signal; and
a phase adjustment unit to invert a phase of the first signal, and
wherein the first signal comprises an amplitude identical to an amplitude of the second signal and a path compensated by a path difference between the first signal and the second signal.

5. The apparatus as claimed in claim 4, wherein:
the signal adjustment unit is configured to adjust the amplitude and compensate for the path of the first signal using a lookup table generated by the data transmission unit; and
the lookup table comprises pieces of information about an amplitude, phase, and path of the second signal mapped with a transmission channel, transmission power, and/or output power of the data transmission signal.

6. The apparatus as claimed in claim 4, wherein:
the signal generation unit further comprises a fine adjustment unit to adjust for the phase, path, and amplitude of the first signal;
the fine adjustment unit is configured to adjust the first signal to have an inverse phase relationship with and the same amplitude as the second signal using a lookup table generated by the data transmission unit; and
the lookup table comprises pieces of information about an amplitude, phase, and path of the second signal mapped with a transmission channel, transmission power, and/or output power of the data transmission signal.

7. A cognitive radio communication apparatus, comprising:
an antenna unit transmit and receive data;
a data transmission unit to provide a data transmission signal;
a data reception unit to receive the data through the antenna unit; and
signal processing unit to cancel the data transmission signal received by the data reception unit,
wherein the data transmission signal received by the data reception unit is canceled by providing an inverse phase signal having an inverse phase relationship with and the same amplitude as the data transmission signal received by the data reception unit.

8. The cognitive radio communication apparatus as claimed in claim 7, wherein, if the antenna unit comprises a single antenna:
the data transmission signal is distributed over the single antenna and the data reception unit at an input terminal of the antenna unit; and
the data transmission signal received by the data reception unit is a signal distributed over the data reception unit.

9. The cognitive radio communication apparatus as claimed in claim 8, wherein:
the data transmission unit is configured to adjust for an amplitude, path, and/or phase of the data transmission signal to provide the inverse phase signal using a lookup table provided by the data transmission unit; and
the lookup table comprises pieces of information about an amplitude, phase, and path of the data transmission signal received by the data reception unit and mapped with a transmission channel, transmission power, and/or output power of the data transmission signal.

10. The cognitive radio communication apparatus as claimed in claim 7, wherein, if the antenna unit comprises a data transmission antenna connected to the data transmission unit and a data reception antenna connected to the data reception unit, the data transmission signal received by the data reception unit is a signal radiated toward the data transmission antenna and applied to the data reception antenna.

11. The cognitive radio communication apparatus as claimed in claim 10, wherein:
the data transmission unit configured to adjust an amplitude, path, and/or phase of the data transmission signal to provide the inverse phase signal using a lookup table provided by the data transmission unit; and
the lookup table comprises pieces of information about an amplitude, phase, and path of the data transmission signal received by the data reception unit and mapped with a transmission channel, transmission power, and/or output power of the data transmission signal.

12. The cognitive radio communication apparatus as claimed in claim 7, wherein the data transmission unit comprises:
a phase adjustment unit to invert a phase of the data transmission signal to provide the inverse phase signal;
a signal adjustment unit to adjust for a path of the inverse phase signal and an amplitude of the inverse phase signal; and
signal cancellation unit to cancel the data transmission signal received by the data reception unit,
wherein the inverse phase signal comprises an amplitude identical to an amplitude of the data transmission signal received by the data reception unit and a path compensated by a path difference between the inverse phase signal and the data transmission signal received by the data reception unit, and
the signal cancellation unit is configured to cancel the data transmission signal received by the data reception unit by combining the data transmission signal received by the data reception unit and the inverse phase signal.

13. The cognitive radio communication apparatus as claimed in claim 7, wherein the data transmission unit comprises:
a signal adjustment unit to adjust for a path of the data transmission signal and an amplitude of the data transmission signal;
a phase adjustment unit to invert a phase of the data transmission signal to provide the inverse phase signal; and
signal cancellation unit to cancel the data transmission signal received by the data reception unit,
wherein the amplitude of the inverse phase signal is identical to an amplitude of the data transmission signal and the path of the inverse phase signal is compensated by a path difference between the inverse phase signal and the data transmission signal through the signal adjustment unit, and
wherein the signal cancellation unit is configured to cancel the data transmission signal by combining the data transmission signal and the inverse phase signal.

* * * * *